April 14, 1959 — P. J. DRYER — 2,882,358

SWITCH

Filed June 1, 1954

INVENTOR
PETER J. DRYER
BY
Winston E. Miller
ATTORNEY

United States Patent Office 2,882,358
Patented Apr. 14, 1959

2,882,358

SWITCH

Peter J. Dryer, Boyne City, Mich., assignor to Boyne Products, Inc., Boyne City, Mich., a corporation of Michigan Application June 1, 1954, Serial No. 433,399

4 Claims. (Cl. 200—16)

The present invention relates to an electrical switch and more particularly to a multiple contact switch having extensive application in the automotive accessory field in association with turn indicator circuits although the switch will be seen to have other applications whereever selective energization of various circuits is desired.

Turn indicators in the form of flasher lights operative from within the body of an automobile have become increasingly important in automotive equipment lines inasmuch as considerable emphasis is being placed upon the safety aspects of automotive equipment. A manual shifting mechanism within the car causes the lighting of units visible in the front and rear of the vehicle to signal a turn, either left or right in accord with the movement of the shifting mechanism by the driver. In general if the turn is to the left the manual shifting energizes a circuit which causes the lights on the left side of the car, fore and aft to be energized. If manually shifted to indicate a right turn the lights on the right side of the car are energized, fore and aft. Normally the lights are a component in the tail light fixtures at the rear, and in the parking light fixtures at the front of the car. A flasher is normally associated with the lights so that the intermittent flashing makes the turn signal more apparent to other automobile drivers.

Since at the heart of the circuit there must be means to cause the necessary electrical relay, various switches have been employed. The switch described in the U.S. Letters Patent 2,528,035 is a type of switch which accomplishes the electrical switching necessary to operate conventional turn indicator circuits. Other switches have been used.

All switches adapted for use in automotive turn indicator circuits possess a normal or neutral position wherein none of the indicator lights are energized. The switch then must be adapted to close selectively so as to actuate the indicator lights as desired. At all times the switch must be closed with respect to the stoplight signals so that the switch does not interfere with the stop signals operating simultaneously or independently of the turn indicators.

Switches devised to accomplish such action have been subject to criticism inasmuch as they are expensive to manufacture and are complex in moving parts. As a consequence of switch complexity and many moving parts, the safe operating life of hitherto known switches has been relatively limited. Since failure in a safety device is injurious and frequently fatal, the present invention is addressed to a turn indicator type switch having a minimum of moving parts and having a test life greater than that of known turn indicator switches.

Accordingly, it is one of the objects of the present invention to provide a turn indicator switch having a useful life in excess of hitherto known indicator type switches.

It is another object of this invention to simplify turn indicator type switches by minimizing the number of parts required.

It is another object of this invention, consequent to simplification, to provide a turn indicator type switch at a lower cost.

Another object is to provide a selective type automotive turn indicator switch wherein contacts are made by the deformation of resilient spring-like members.

Other objects and advantages will become increasingly apparent as the description proceeds.

General description

In general a rectangular switch case is provided which is adapted for association with standard automotive turn indicator mounting elements. It is of course understood that modification in the case to accommodate any particular mounting problem is contemplated without departure from the spirit of the invention. A slot is provided in the case and an actuator arm is movable in that slot, the actuator arm being normally biased by springs to a centered position. By means not a part of this invention the actuator arm is moved in the slot either to the left or right in accord with the manual movements of the operator. Flat springs ride in tensional zigzag fashion on an insulated and recessed retainer plate having a registering slot therethrough which permits the extension of the actuator arm so as to engage the flat spring as the actuator arm is biased either to the left or to the right. Thus the actuator arm selectively deforms one or the other of the flat spring contactor elements detaching it from a normally closed contact and closing it, upon deformation, with a selected different set of contactor posts. Upon release of the normal holding pressure the actuator arm, in response to the urging of the springs, returns to the normal centered position in the slot and the normal closed relation between contactor elements and the central contactor post is restored.

Since the flat spring contactor element possesses an indefinite life and contact is tensionally established with the selected contactor posts, a simple switch is provided having a minimum number of moving components insuring long trouble-free service with low initial cost.

Specific description

Figure 1:
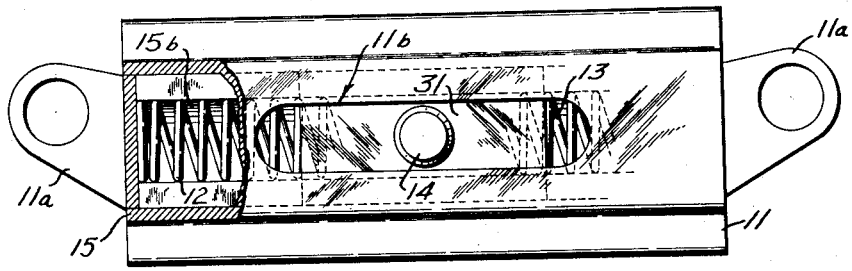
Figure 1 is a top plan view of a switch in accord with this invention and having a portion of the case cut away to show the spring mounting detail.
Figure 2:
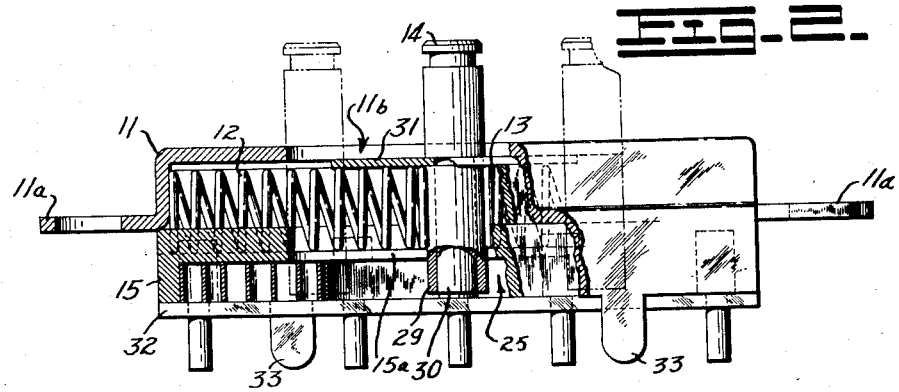
Figure 2 is a side elevational view of a switch in accord with this invention and having a portion cut away to reveal the interrelationship of switch components in neutral position and showing the left and right shifted positions of the movable arm in phantom line.

A generally rectangular case 11 is provided having clearance and mounting provisions in accord with standard installation components. While the mounting ears 11a indicate a common mounting means other means may be employed. The case 11 provides a housing for the coil spring members 12 and 13 and is provided with a slot 11b for the accommodation of the movable actuator arm 14. A retainer plate 15 of insulating material, and provided with slot 15a in register with the slot 11b of the case 11 is provided. The plate 15 is grooved on one side to mate partially with the outside diameter of the actuating coil springs 12 and 13. Thus the grooves 15b assure alignment of the springs 12 and 13 paralleling the principal axis of the slot 11b and grooves 15b. The springs 12 and 13 urge the movable actuator arm 14 into a normally neutral or centered position as shown in Figure 1. The movement of the actuator arm 14 against one or the other of the springs 12 and 13 is indicated in the phantom lines in Figure 2.

On the side opposite the grooved side of the retainer plate 15 are a plurality of contactor posts 16, 17, 18, 19, 20, 21 and 22. The said contactor posts are firmly imbedded in the plate 15 and extend outwardly therefrom to provide electrical connection for leads outside of the case 11. Two flat spring-like identical beryllium alloy contactor members 23 and 24 are oppositely positioned in zig-zag fashion in the recessed portion 25 of the plate 15.

Figure 3:
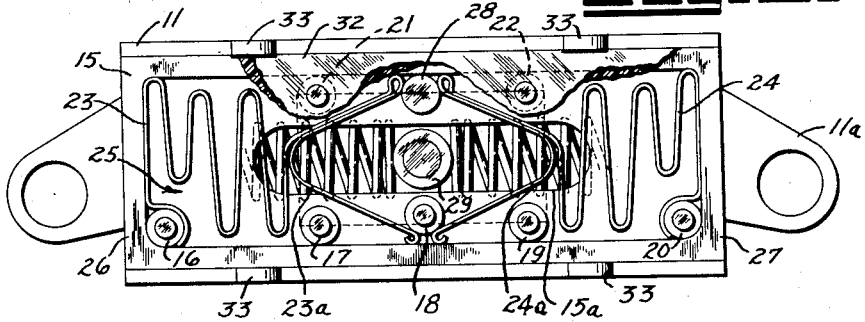
Figure 3 is a bottom plan view of a switch in accord with this invention and having the insulating base plate cut away to reveal the normal positioning of the contact posts in relation to the flat spring type contactor elements.

The recessed portion 25 of the plate 15 thus provides a way or guide portion for the movement of the flat spring zig-zag members 23 and 24. Thus the movement or deformation of the members 23 and 24 is contained within the recess 25. Other conducting material may form the contactor members 23 and 24 but berylliumcopper alloy material has greater life than presently known material and is therefore preferred. The contactor element 23 is normally and continually in contact with the post 16 at one end and the other end of the contactor element 23 is in normal contact with the center post 18. Similarly, but oppositely, the contactor element 24 is in normal and continual contact with the post 20 on one end and the other end of the contactor element 24 is in contact with the center post 18 as shown in Figure 3. The contactor elements 23 and 24 have a width somewhat less than the depth of the recess 25 so as to allow sufficient clearance for horizontal movement of the contactor members 23 and 24. In normal position, as shown in Figure 3, the contactor members 23 and 24 form a shallow V with a rounded apex stopping short of the terminal ends of the slot 15a in the plate 15. A portion of the flat spring comprising the contactor members 23 and 24 parallels one leg of the shallow V portion and coils in zig-zag fashion for the remainder of the recessed portion 25 of the plate 15 and finally nests in flat relationship against the end walls 26 and 27, respectively, and in constant stressed relationship against the posts 16 and 20.

In the normal position electrical contact exists between contact posts 16, 18, and 20 through the members 23 and 24. Opposite contact post 17 is post 21. Opposite post 19 is post 22. None of these posts contact the contactor members 23 and 24 when the movable arm 14 is in the neutral or centered position. The blank post 28, opposite the contactor post 18, constitutes a non-conducting stop balancing the normal positioning of the contactor elements 23 and 24. The blank post 28 is an insulated and integral extension of the plate 15 approximating the size of the conducting contactor posts within the recessed portion 25 of the plate 15.

When the arm 14 is forced into the extreme position, either left or right (as indicated in phantom line in Figure 2) it engages the inner end of the V position of the members 23 or 24 and moves the members selectively out of contact with the post 18 and into contact with either the pair of posts 21 and 17, or the pair of posts 19 and 22, depending upon the direction of movement of the arm 14. It will be noted that the portion of the arm 14 engaging the contactor members 23 and 24 is fully insulated by the sleeve 29 constituting a cylindrical sheath around the arm lower extension 30. The lower extension 30 of the arm 14 with its insulating sleeve 29 thus extends into the recess 25 so that movement of the arm 14 will cause selective movement of the contactor member 23 or 24.

A flat guide 31 is attached to the arm 14 and rides on the inner side of the case 11 and plate 15 preventing the escape of the arm 14 and preventing misalignment in the arm 14.

Figure 4:
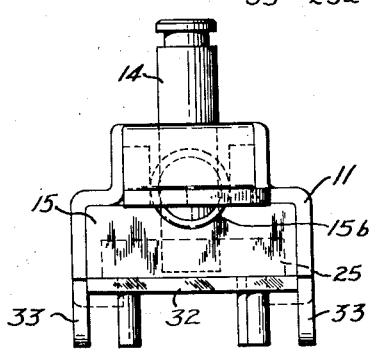
Figure 4 is an end elevational view of the switch as described in the other figures and indicating the external form of the switch case and depending contactors.

A flat rectangular switch cover 32 of electrically insulated material and provided with openings registering with the extending contactor posts 16–22 is placed in mating relation with the plate 15 covering the recess 25 and permitting the ends of the contactor posts 16–22 to extend therefrom. For simplicity of assembly tabs 33, extending from and integral with the case 11, are foldable over the cover 32 (Figure 4) and thereby retain the cover 32 securely over the recess 25 so as to prevent the misalignment of the contactor members 23 and 24 and to provide a simple insulated switch closure. Other closure means and other retainers than the tabs 33 can be utilized and the specific example is that of a preferred embodiment. In the drawing (Figures 2, 3 and 4) the tabs 33 are illustrated in position prior to assembly and are subsequently crimped over to retain the cover 32 when the switch assembly is complete as indicated by the phantom line position in Figure 4.

Operation

In operation a circuit is normally closed between contactor posts 20 and 18 and contactor posts 16 and 18. This contact is maintained by reason of the resilient contactor members 23 and 24 contacting the common post 18 and terminally connecting with posts 16 and 20 respectively. When the actuator arm 14 is in its normal position the contacts recited are undisturbed.

When the actuator arm 14 is shifted in the registering slots 15a and 11b the insulated extension 29 of the arm 14 engages the flat spring contactor members 23 and 24, in the V portion 23a or 24a depending upon the direction in which the actuator arm 14 is moved. This movement of the arm 14 causes selective resilient displacement of the selected contactor member 23 or 24 and forces the contactor member 23 or 24 out of engagement with the post 18 and into resilient and deformed engagement with posts 21 and 17 or 22 and 19 depending upon the direction of movement of the arm 14. In any event one of the contactor members 23 or 24 is always engaged with post 18 although one or the other of the contactor members 23 or 24 may be selectively deformed to engage or close on other posts.

While the depending posts 16–22 are shown as cylindrical their extensions beyond the confines of the switch case 11 and cover 32 may take any convenient electrical connector form for connection to appropriate electrical leads.

Having thus disclosed the simple structural characteristics of a specific embodiment of a switch in accord with this invention those skilled in the electrical arts will be quick to appreciate its circuit application. It has already found adaptability to automotive turn signal circuits, as indicated. The deformation of one or the other of the contactor elements 23 or 24 causes energization of signal lights fore and aft of the automobile and on the right or left side selectively while not interfering with the normal tail light circuit on both sides of the car whether in normal or deformed position. When the actuator arm 14 is mechanically or manually released from left or right bias, it is spring returned to normal position and the deformed resilient contactor member is returned to normal or neutral position.

Having thus described a specific embodiment of my invention it will be understood that certain modifications are obvious to those skilled in the art. All such modifications are intended to fall within the spirit of this invention limited only by the hereinafter appended claims.

I claim:

1. In an electrical switch for selective contact the combination including: a plurality of contactor posts; a pair of oppositely positioned flat spring contactor elements in closed contact with some of said posts; an arm engageable with a part of said contactor elements to cause deformation in a selected one of said contactor elements from its normal position and causing contact with selected others of said contactor posts; and a pair of springs oppositely positioned against said arm to normally center said arm between its extremes of lateral movement.

2. In an electrical switch for selective contact, the combination including: a case; an arm reciprocable through a slot in said case and extending into said case; springs normally centering said arm midway between its extremes of lateral movement; a plate of insulating material positioning said springs and being slotted to register with said slotted case; a plurality of contactor posts seated in said plate; a pair of oppositely positioned flat spring contactor elements in zig-zag position and in normal closed contact with some of said contactor posts and subject to deformation in accord with the movement of said arm to engage others of said contactor posts; and an insulating cover having openings registrable over the extensions of said contactor posts clinched to the bottom of said case.

3. In an electrical switch for selective contact, the combination including: a case having a slot therethrough; an insulating plate having a slot therethrough in register with the slot in said case and being rectangularly recessed on one side to provide a flat guideway and being grooved on the other side; an actuator arm reciprocable in the slots provided through said case and said insulating plate; coil springs confined by said case and by the grooves in said plate normally centering said actuator arm midway of the extremes of the slot; a plurality of contactor posts seated in the recessed portion of said plate; a pair of oppositely disposed flat spring elements arranged horizontally in zig-zag manner on either side of said actuator arm and slidable in the recess side of said plate and each of said elements being in normal contact with selected of said contactor posts at either end of said plate and contacting a common contactor post adjacent the center of said plate and being subject to selective deformation upon movement of said actuator arm to contact selected others of said contactor posts; and an insulated cover through which extensions of said contactor posts extend.

4. In a switch for selected electrical contact the combination comprising: a recessed case of insulating material; a plurality of contactor posts through said case and extending into the recess thereof; a pair of opposed deformable flat spring contactors in the recess of said case and in closed contact with selected of said contactor posts; an arm engageable with said flat spring contactors and selectively deforming one or the other of said flat spring contactors when out of normal position; pressure exerting members mounted on each side of said arm and urging said arm into a normal centered position; and a case closure member confining and positioning said pressure exerting means.

References Cited in the file of this patent

UNITED STATES PATENTS

| | | |
|---|---|---|
| Re. 17,897 | Bramming | Dec. 9, 1930 |
| 2,068,632 | Stites | Jan. 19, 1937 |
| 2,222,765 | Geyer | Nov. 26, 1940 |
| 2,249,375 | Day | July 15, 1941 |
| 2,528,115 | Clayton | Oct. 31, 1950 |
| 2,542,242 | Fuller | Feb. 20, 1951 |
| 2,611,046 | Fuller | Sept. 16, 1952 |
| 2,672,531 | Stevenson | Mar. 16, 1954 |
| 2,714,140 | Spicer | July 26, 1955 |
| 2,762,880 | Hathorn et al. | Sept. 11, 1956 |
| 2,785,240 | Carling | Mar. 12, 1957 |

FOREIGN PATENTS

| | | |
|---|---|---|
| 504,134 | Great Britain | Apr. 20, 1939 |
| 714,855 | Germany | Dec. 8, 1941 |